Patented July 26, 1927.

1,637,281

UNITED STATES PATENT OFFICE.

HERMANN SCHATZ, OF SCHWANHEIM-ON-THE-MAIN, GERMANY, ASSIGNOR TO THE FIRM I. G. FARBENINDUSTRIE AKTIENGESELLSCHAFT, OF FRANKFORT-ON-THE-MAIN, GERMANY.

PRODUCTION OF COBALTOUS ACETATE.

No Drawing. Application filed October 28, 1926, Serial No. 144,920, and in Germany November 27, 1925.

This invention relates to the production of cobaltous acetate. When cobalt is extracted from ores in which this metal—besides other contaminations—is combined with nickel, it is always obtained in the form of cobaltic hydroxid. Cobaltous acetate is usually obtained from this hydroxid by following the laborious way of firstly dissolving the cobaltic hydroxid in a mineral acid, secondly completing, if required, by suitable additions, the reduction which starts by itself, thirdly precipitating, by means of soda ash cobaltous carbonate from the cobaltous salt solutions, fourthly washing the carbonate to remove alkali as far as possible, and finally dissolving the cobaltous carbonate in acetic acid.

Now I have succeeded in directly transforming cobaltic hydroxid to cobaltous acetate by means of acetic acid solution. For this purpose I introduce cobaltic hydroxid and acetic acid with the addition of a suitable reducing agent into a closed vessel, and heat the contents to a temperature above the boiling-point of the solution. The dissolution of the hydroxid goes on rapidly owing to the increase of pressure.

As reducing agents we may consider:— agents of organic nature like alcohol, as well as inorganic substances like metals. The best results have been obtained by adding metallic cobalt in the form of a fine powder, as in this case no foreign matter is introduced which would have to be removed later on.

For instance, I may proceed as follows:— Freshly precipitated cobaltic hydroxid coming, for instance, from a filter press and containing 50 p. ct. of water, is introduced, together with an amount of metallic cobalt powder calculated to form cobaltous oxid from the said hydroxid, and acetic acid in slight excess above the amount theoretically required, into an iron autoclave coated with an acid-proof inner lining. The contents are heated under stirring to about 120° C., whereby the pressure in the autoclave is increased to 2.5 to 3.25 atm. After a short time a cobaltous acetate solution has formed which may be easily separated from the undissolved remnants of oxid. Preferably the acetic acid is, by the addition of water, only diluted to such an extent that, taking into account the water introduced by the moist cobaltic hydroxid, a nearly saturated cobaltous acetate solution is obtained, from which, after filtration, crystallized cobaltous acetate separates immediately on cooling-down.

Cobaltic hydroxid already dried may also be used for my process; of course, the dissolution will take a longer time in this case.

The process may be applied in an analogous way to nickel salts.

I am aware that it has already been proposed to produce manganese acetate from manganese dioxid by means of acetic acid and an aldehyde. However, this process was carried out under common pressure and required a manifold excess of acetic acid.

I claim:—

1. Process of producing cobaltous acetate from cobaltic hydroxid, consisting in heating cobaltic hydroxid with acetic acid in presence of a reducing agent in a closed vessel to a temperature above the boiling point of the solvent acetic acid.

2. Process of producing cobaltous acetate from cobaltic hydroxid, consisting in heating cobaltic hydroxid with acetic acid in presence of finely distributed metallic cobalt in a closed vessel to a temperature above the boiling point of the solvent acetic acid.

3. Process of producing cobaltous acetate from cobaltic hydroxid, consisting in heating cobaltic hydroxid with aqueous acetic acid in presence of a reducing agent in a closed vessel to a temperature above the boiling point of the solvent acetic acid, filtering off the hot solution from the undissolved hydroxid, and separating the cobaltous acetate by crystallization.

4. Process of producing cobaltous acetate from cobaltic hydroxid, consisting in heating cobaltic hydroxid with aqueous acetic acid in presence of finely distributed metallic cobalt in a closed vessel to a temperature above the boiling point of the solvent acetic acid, filtering off the hot solution from the undissolved hydroxid, and separating the cobaltous acetate by crystallization.

In testimony whereof I affix my signature.

HERMANN SCHATZ.